US012348142B2

(12) United States Patent
Chen

(10) Patent No.: US 12,348,142 B2
(45) Date of Patent: Jul. 1, 2025

(54) CONVERTER HAVING LOAD TRANSITION DETECTING MECHANISM

(71) Applicant: ANPEC ELECTRONICS CORPORATION, Hsinchu (TW)

(72) Inventor: Fu-Chuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 230 days.

(21) Appl. No.: 18/447,325

(22) Filed: Aug. 10, 2023

(65) Prior Publication Data

US 2024/0388204 A1 Nov. 21, 2024

(30) Foreign Application Priority Data

May 19, 2023 (TW) .................................. 112118628

(51) Int. Cl.
*H02M 3/158* (2006.01)
(52) U.S. Cl.
CPC .................................. *H02M 3/158* (2013.01)
(58) Field of Classification Search
CPC .................................................... H02M 3/158
See application file for complete search history.

(56) References Cited

U.S. PATENT DOCUMENTS

| 10,756,627 | B2* | 8/2020 | Hsu | H02M 3/158 |
| 11,863,058 | B2* | 1/2024 | Ozalevli | H02M 3/158 |
| 2003/0142156 | A1* | 7/2003 | Sato | B41J 2/0458 |
| | | | | 347/9 |
| 2009/0230930 | A1* | 9/2009 | Jain | H02M 3/1588 |
| | | | | 323/234 |
| 2011/0316518 | A1 | 12/2011 | Feng et al. | |
| 2014/0021930 | A1* | 1/2014 | Liu | H02M 3/1584 |
| | | | | 323/271 |
| 2014/0084892 | A1 | 3/2014 | Trautmann et al. | |
| 2018/0342954 | A1* | 11/2018 | Chung | H02M 3/33507 |
| 2023/0318455 | A1* | 10/2023 | Chakraborty | H02M 1/15 |
| | | | | 323/271 |
| 2024/0178754 | A1* | 5/2024 | Matsumura | H02M 3/158 |

FOREIGN PATENT DOCUMENTS

TW 201220661 A1 5/2012

* cited by examiner

*Primary Examiner* — Rafael O De Leon Domenech
(74) *Attorney, Agent, or Firm* — Li & Cai Intellectual Property Office

(57) ABSTRACT

A power converter having a load transition detecting mechanism is provided. A comparator of the power converter compares an output voltage of the power converter or a divided voltage thereof with a reference voltage to output a comparison signal. A load transition detecting circuit of the power converter detects the comparison signal, and samples and holds some of a plurality of waveforms of the comparison signal. The load transition detecting circuit of the power converter calculates an average value of a plurality of parameters respectively of the sampled waveforms as a load steady state reference value. The load transition detecting circuit of the power converter compares the parameter of each of the plurality of waveforms of the comparison signal with the load steady state reference value to determine whether or not a load is in a steady state or in a transient state.

15 Claims, 11 Drawing Sheets

CONVERTER HAVING LOAD TRANSITION DETECTING MECHANISM

CROSS-REFERENCE TO RELATED PATENT APPLICATION

This application claims the benefit of priority to Taiwan Patent Application No. 112118628, filed on May 19, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a load transition detecting mechanism.

BACKGROUND OF THE DISCLOSURE

Power converters are indispensable devices. The power converters are used for adjusting power and supplying the adjusted power to loads. However, during operations of the power converters, the power converters cannot obtain changes in the loads to determine whether or not the load is in a steady state or in a transient state, and cannot further determine whether or not the load is obtaining power from an output terminal of the power converter or is releasing energy.

SUMMARY OF THE DISCLOSURE

In response to the above-referenced technical inadequacies, the present disclosure provides a power converter having a load transition detecting mechanism. The power converter includes a high-side switch, a low-side switch, a control circuit, a comparator and a load transition detecting circuit. A first terminal of the high-side switch is coupled to an input voltage. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. A second terminal of the inductor is connected to a first terminal of an output capacitor. A second terminal of the output capacitor is grounded. A node between the second terminal of the inductor and the first terminal of the output capacitor is used as a feedback node of the power converter and is connected to a load. An output terminal of the control circuit is connected to a control terminal of the high-side switch and a control terminal of the low-side switch. A first input terminal of the comparator is connected to the feedback node of the power converter. A second input terminal of the comparator is coupled to a reference voltage. An output terminal of the comparator is connected to an input terminal of the control circuit. The load transition detecting circuit is connected to an output terminal of the comparator. The load transition detecting circuit detects a plurality of parameters of a plurality of waveforms of a comparison signal from the output terminal of the comparator. The load transition detecting circuit samples and holds some of the plurality of waveforms of the comparison signal as a plurality of sampled waveforms. The load transition detecting circuit calculates an average value of the plurality of parameters respectively of the plurality of sampled waveforms as a load steady state reference value. The load transition detecting circuit compares the parameter of each of the plurality of waveforms of the comparison signal with the load steady state reference value to determine whether or not the load is in a steady state or in a transient state and to determine an amplitude of a transition occurring in the load.

In certain embodiments, the load transition detecting circuit calculates a difference between the parameter of each of the plurality of waveforms of the comparison signal and the load steady state reference value. The load transition detecting circuit determines whether or not the load is in the steady state or in the transient state and determines the amplitude of the transition occurring in the load according to the difference.

In certain embodiments, the comparison signal outputted by the comparator includes a plurality of positive half-waves and a plurality of negative half-waves. The load transition detecting circuit samples and holds at least one of the plurality of positive half-waves as at least one sampled positive half-waves. The load transition detecting circuit samples and holds at least one of the plurality of negative half-waves as at least one sampled negative half-waves. The load transition detecting circuit calculates an average value of the parameters of the at least one sampled positive half-waves and the at least one sampled negative half-waves, as the load steady state reference value.

In certain embodiments, when the parameter of one of the plurality of waveforms of the comparison signal that is currently detected by the load transition detecting circuit is equal to the load steady state reference value, the load transition detecting circuit determines that the load is in the steady state.

In certain embodiments, when the parameter of one of the plurality of waveforms of the comparison signal that is currently detected by the load transition detecting circuit is not equal to the load steady state reference value, the load transition detecting circuit determines that the load is in the transient state.

In certain embodiments, the load transition detecting circuit determines whether or not the parameter of one of the plurality of waveforms of the comparison signal that is currently detected is higher than the load steady state reference value to determine whether or not the load is obtaining power from an output terminal of the power converter.

In certain embodiments, when the parameter of one of the plurality of waveforms of the comparison signal that is currently detected by the load transition detecting circuit is higher than the load steady state reference value, the load transition detecting circuit determines that the load is obtaining power from an output terminal of the power converter.

In certain embodiments, when the parameter of one of the plurality of waveforms of the comparison signal that is currently detected by the load transition detecting circuit is lower than the load steady state reference value, the load transition detecting circuit determines that the load is releasing energy.

In certain embodiments, the load transition detecting circuit subtracts the load steady state reference value from the parameter of one of the plurality of waveforms of the comparison signal that is currently detected by the load transition detecting circuit to obtain a difference. The load transition detecting circuit determines whether or not the load is obtaining power from an output terminal of the power converter or is releasing energy according to the difference.

In certain embodiments, the load transition detecting circuit includes a waveform detector circuit, a sample and hold circuit, an average value calculating circuit and a load transition determining circuit. The waveform detector circuit is connected to the output terminal of the comparator. The waveform detector circuit is configured to detect the parameters of the plurality of waveforms of the comparison signal from the output terminal of the comparator. The sample and hold circuit is connected to the waveform detector circuit. The sample and hold circuit is configured to sample and hold some of the plurality of waveforms of the comparison signal detected by the waveform detector circuit as the plurality of sampled waveforms. The average value calculating circuit is connected to the sample and hold circuit. The average value calculating circuit is configured to calculate an average value of the plurality of parameters respectively of the plurality of sampled waveforms, as the load steady state reference value. The load transition determining circuit is connected to the average value calculating circuit. The load transition determining circuit compares the parameter of each of the plurality of waveforms of the comparison signal with the load steady state reference value to determine whether or not the load is in the steady state or in the transient state and to determine the amplitude of the transition occurring in the load.

In certain embodiments, the waveform detector circuit includes a waveform width detecting circuit. The waveform width detecting circuit is connected to the output terminal of the comparator and an input terminal of the sample and hold circuit. The waveform width detecting circuit is configured to detect a plurality of widths of the plurality of waveforms respectively of the comparison signal from the output terminal of the comparator. The average value calculating circuit calculates an average value of the plurality of widths respectively of the plurality of sampled waveforms, as the load steady state reference value. The load transition determining circuit compares the width of each of the plurality of waveforms of the comparison signal with the load steady state reference value to determine whether or not the load is in the steady state or in the transient state and to determine the amplitude of the transition occurring in the load.

In certain embodiments, the waveform detector circuit includes a waveform frequency detecting circuit. The waveform frequency detecting circuit is connected to the output terminal of the comparator and the input terminal of the sample and hold circuit. The waveform frequency detecting circuit is configured to detect a plurality of frequencies of the plurality of waveforms respectively of the comparison signal from the output terminal of the comparator. The average value calculating circuit calculates an average value of the plurality of frequencies respectively of the plurality of sampled waveforms, as the load steady state reference value. The load transition determining circuit compares the frequency of each of the plurality of waveforms of the comparison signal with the load steady state reference value to determine whether or not the load is in the steady state or in the transient state and to determine the amplitude of the transition occurring in the load.

In certain embodiments, the power converter further includes a voltage driver circuit. The voltage driver circuit is connected to a node between the second terminal of the inductor and the first terminal of the output capacitor. The voltage driver circuit is connected to the first input terminal of the comparator. The voltage driver circuit is configured to divide a voltage of the feedback node to output a feedback voltage to the first input terminal of the comparator.

In certain embodiments, the voltage driver circuit includes a first resistor and a second resistor. A first terminal of the first resistor is connected to the node between the second terminal of the inductor and the first terminal of the output capacitor. A first terminal of the second resistor is connected to a second terminal of the first resistor. A second terminal of the second resistor is grounded. A node between the first terminal of the second resistor and the second terminal of the first resistor is used as the feedback node of the power converter and is connected to the first input terminal of the comparator.

In certain embodiments, the power converter further includes a feedback adjusting circuit. The feedback adjusting circuit is connected to the feedback node of the power converter, the first input terminal of the comparator and a ramp signal generator. The feedback adjusting circuit adjusts a feedback signal from the feedback node to output a feedback adjusted signal to the first input terminal of the comparator according to a ramp signal from the ramp signal generator.

As described above, the present disclosure provides the power converter having the load transition detecting mechanism. The load transition detecting circuit of the power converter of the present disclosure detects data at the output terminal of the power converter connected to the load to determine that the load is in the steady state or in the transient state. When the load is in the transient state, the load transition detecting circuit of the power converter of the present disclosure is able to further determine whether or not the load is obtaining power from the output terminal of the power converter or is releasing energy.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
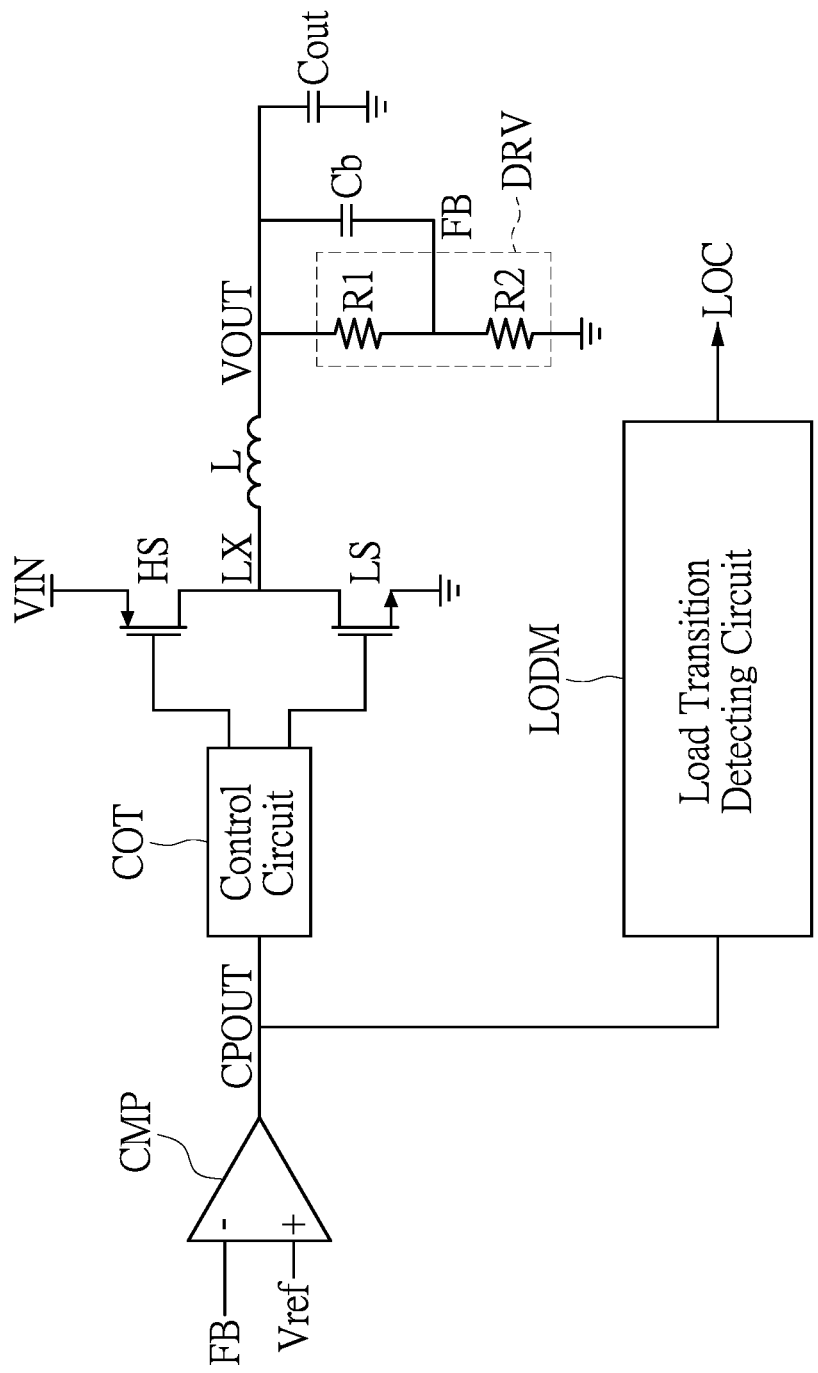
FIG. 1 is a block diagram of a power converter having a load transition detecting mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a power converter having a load transition detecting mechanism according to a first embodiment of the present disclosure.

The power converter of the first embodiment of the present disclosure may include a high-side switch HS, a low-side switch LS, a control circuit COT, a comparator CMP and a load transition detecting circuit LODM.

A first terminal of the high-side switch HS is coupled to an input voltage VIN. A first terminal of the low-side switch LS is connected to a second terminal of the high-side switch HS. A second terminal of the low-side switch LS is grounded. A node LX between the first terminal of the low-side switch LS and the second terminal of the high-side switch HS is connected to a first terminal of an inductor L. A second terminal of the inductor L is connected to a first terminal of the output capacitor Cout. A second terminal of the output capacitor Cout is grounded.

A node between the second terminal of the inductor L and the first terminal of the output capacitor Cout is an output terminal of the power converter. The output terminal of the power converter is connected to a load for supplying power to the load.

The power converter of the first embodiment of the present disclosure may further include a voltage driver circuit DRV for detection of a change in a state of the load. The voltage driver circuit DRV includes a first resistor R1 and a second resistor R2. A first terminal of the first resistor R1 (that is an input terminal of the voltage driver circuit DRV) is connected to the node between the second terminal of the inductor L and the first terminal of the output capacitor Cout (that is the output terminal of the power converter). A second terminal of the first resistor R1 is connected to a first terminal of the second resistor R2. A second terminal of the second resistor R2 is grounded.

A node between the second terminal of the first resistor R1 and the first terminal of the second resistor R2 is used as a feedback node and is connected to a first input terminal such as an inverting input terminal of the comparator CMP. A voltage of the feedback node of the power converter is used as a feedback voltage FB as described herein. The feedback voltage FB is a divided voltage of an output voltage VOUT of the power converter. The feedback voltage FB is inputted to the first input terminal such as the inverting input terminal of the comparator CMP. A second input terminal such as a non-inverting input terminal of the comparator CMP is coupled to a reference voltage Vref.

In the first embodiment of the present disclosure, the comparator CMP compares the feedback voltage FB between the second terminal of the first resistor R1 and the first terminal of the second resistor R2 (that is the divided voltage of the output voltage VOUT of the power converter) with the reference voltage Vref to output a comparison signal CPOUT.

In the first embodiment of the present disclosure, the divided voltage of the output voltage VOUT of the power converter connected to the load is detected, and a change in the load is determined accordingly.

In practice, the output voltage VOUT of the power converter of the present disclosure may be directly detected. Under this condition, the voltage driver circuit DRV may be omitted from the power converter of the present disclosure. The node between the second terminal of the inductor L and the first terminal of the output capacitor Cout (that is the output terminal of the power converter) may be directly used as the feedback node connected to the first input terminal such as the inverting input terminal of the comparator CMP. The comparator CMP compares the output voltage VOUT of the power converter with the reference voltage Vref to output the comparison signal CPOUT.

If necessary, the power converter of the first embodiment of the present disclosure may include a feedback capacitor Cb. A first terminal of the feedback capacitor Cb may be connected to the node between the second terminal of the inductor L and the first terminal of the output capacitor Cout.

A second terminal of the feedback capacitor Cb may be connected to the node between the second terminal of the first resistor R1 and the first terminal of the second resistor R2.

An output terminal of the comparator CMP is connected to an input terminal of the control circuit COT. An output terminal of the control circuit COT is connected to a control terminal of the high-side switch HS and a control terminal of the low-side switch LS. The control circuit COT outputs a high-side control signal to the control terminal of the high-side switch HS according to the comparison signal CPOUT from the comparator CMP for controlling an operation of the high-side switch HS. The control circuit COT outputs a low-side control signal to the control terminal of the low-side switch LS according to the comparison signal CPOUT from the comparator CMP for controlling an operation of the low-side switch LS.

It is worth noting that, the load transition detecting circuit LODM is connected to the output terminal of the comparator CMP. When the high-side switch HS and the low-side switch LS operate, the load transition detecting circuit LODM detects a plurality of parameters of a plurality of waveforms of the comparison signal CPOUT from the output terminal of the comparator CMP. The load transition detecting circuit LODM samples and holds some of the plurality of waveforms of the comparison signal CPOUT detected by the load transition detecting circuit LODM as a plurality of sampled waveforms.

Then, the load transition detecting circuit LODM calculates an average value of the plurality of parameters respectively of the plurality of sampled waveforms of the comparison signal CPOUT as a load steady state reference value.

The load transition detecting circuit LODM compares the parameter of each of the plurality of waveforms of the comparison signal CPOUT with the load steady state reference value to determine whether or not the load is in a steady state or in a transient state and to determine an amplitude of a transition occurring in the load to output a load transition determined signal LOC.

Figure 2:
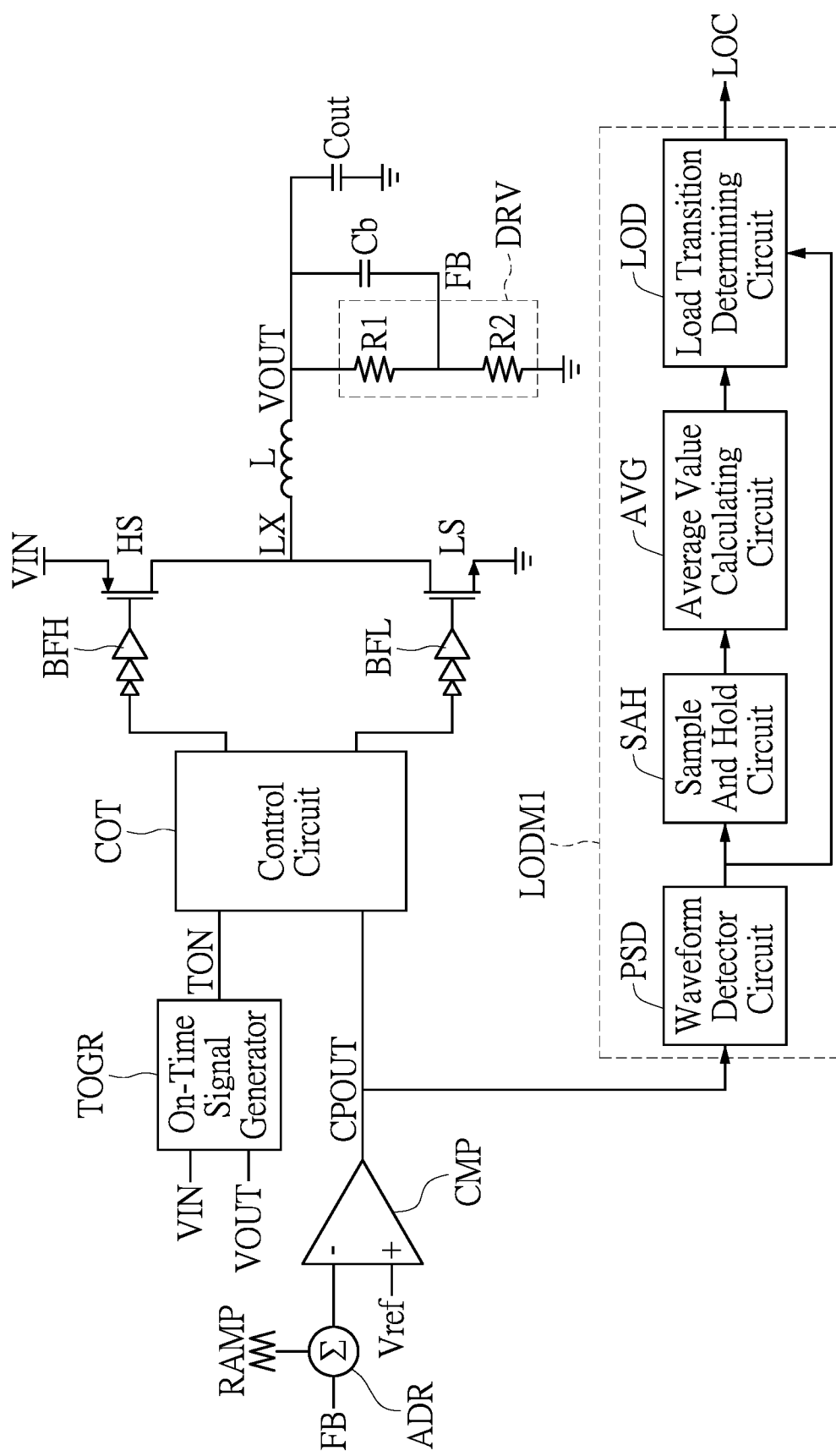
FIG. 2 is a block diagram of a power converter having a load transition detecting mechanism according to a second embodiment of the present disclosure.
Figure 3:
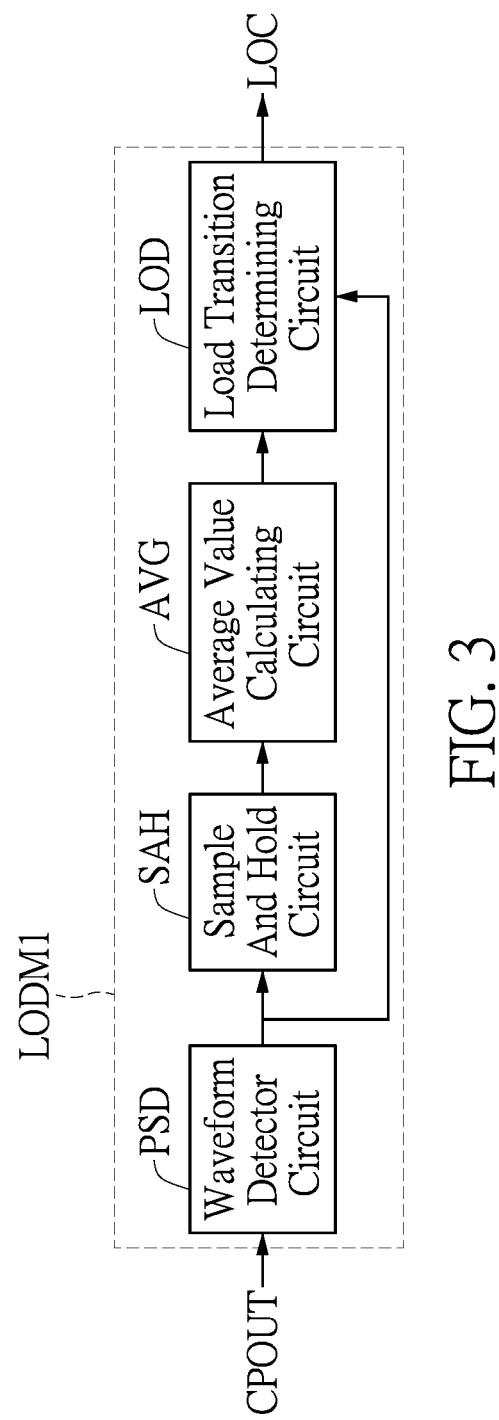
FIG. 3 is a block diagram of a load transition detecting circuit of the power converter having the load transition detecting mechanism according to the second embodiment of the present disclosure.

Reference is made to FIGS. 2 and 3, in which FIG. 2 is a block diagram of a power converter having a load transition detecting mechanism according to a second embodiment of the present disclosure, and FIG. 3 is a block diagram of a load transition detecting circuit of the power converter having the load transition detecting mechanism according to the second embodiment of the present disclosure.

In the second embodiment, the power converter of the present disclosure may include the high-side switch HS, the low-side switch LS, the control circuit COT, the comparator CMP and a load transition detecting circuit LODM1. The descriptions of the second embodiment that are the same as that of the first embodiment are not repeated herein.

Differences between the second and first embodiments are described in detail as follows.

In the second embodiment, the power converter of the present disclosure further includes a feedback adjusting circuit ADR such as, but not limited to, an adder. One input terminal of the feedback adjusting circuit ADR is connected to the feedback node of the power converter. In practice, the feedback node of the power converter is the node between the second terminal of the first resistor R1 and the first terminal of the second resistor R2, or is the node between the second terminal of the inductor L and the first terminal of the output capacitor Cout. In addition, another input terminal of the feedback adjusting circuit ADR may be connected to a ramp signal generator.

An output terminal of the feedback adjusting circuit ADR is connected to the first input terminal such as the inverting input terminal of the comparator CMP.

The feedback adjusting circuit ADR may, according to parameters of one or more of a plurality of waveforms of a ramp signal RAMP from the ramp signal generator, adjusts a feedback signal from the feedback node of the power converter to output a feedback adjusted signal to the first input terminal such as the inverting input terminal of the comparator CMP.

The control circuit COT outputs the high-side control signal to the control terminal of the high-side switch HS according to the feedback adjusted signal from the feedback adjusting circuit ADR to control the operation of the high-side switch HS. The control circuit COT outputs the low-side control signal to the control terminal of the low-side switch LS according to the feedback adjusted signal from the feedback adjusting circuit ADR for controlling the operation of the low-side switch LS.

If necessary, the power converter may further include an on-time signal generator TOGR. One input terminal of the on-time signal generator TOGR may be coupled to an input voltage VIN to receive the input voltage VIN. Another input terminal of the on-time signal generator TOGR may be connected to the feedback node of the power converter to receive the output voltage VOUT of the power converter from the feedback node.

The on-time signal generator TOGR may determine an on-time of the high-side switch HS and an on-time of the low-side switch LS to output an on-time signal TON according to the input voltage VIN and the voltage of the feedback node of the power converter. The control circuit COT may control the on-time of the high-side switch HS and the on-time of the low-side switch LS according to the on-time signal TON from the on-time signal generator TOGR.

If necessary, the power converter may further include a high-side buffer BFH, a low-side buffer BFL or a combination thereof.

An input terminal of the high-side buffer BFH is connected to the output terminal of the control circuit COT. An output terminal of the high-side buffer BFH is connected to the control terminal of the high-side switch HS. The high-side buffer BFH is configured to buffer the high-side control signal to be outputted to the control terminal of the high-side switch HS from the control circuit COT.

An input terminal of the low-side buffer BFL is connected to the output terminal of the control circuit COT. An output terminal of the low-side buffer BFL is connected to the control terminal of the low-side switch LS. The low-side buffer BFL is configured to buffer the low-side control signal to be outputted to the control terminal of the low-side switch LS from the control circuit COT.

It is worth noting that, in the second embodiment of the present disclosure, the load transition detecting circuit LODM1 includes a waveform detector circuit PSD, a sample and hold circuit SAH, an average value calculating circuit AVG and a load transition determining circuit LOD as shown in FIGS. 2 and 3.

An input terminal of the waveform detector circuit PSD is connected to the output terminal of the comparator CMP. An output terminal of the waveform detector circuit PSD is connected to an input terminal of the sample and hold circuit SAH. An output terminal of the sample and hold circuit SAH is connected to an input terminal of the average value calculating circuit AVG. An output terminal of the average value calculating circuit AVG is connected to an input terminal of the load transition determining circuit LOD.

The waveform detector circuit PSD detects the plurality of parameters (such as, but not limited to, widths, frequencies and working periods) of the plurality of waveforms (such as, but not limited to pulse waves) of the comparison signal CPOUT.

Then, the sample and hold circuit SAH samples and holds some of the plurality of waveforms of the comparison signal CPOUT detected by the waveform detector circuit PSD, as the plurality of sampled waveforms.

Then, the average value calculating circuit AVG calculates the average value of the plurality of parameters (such as, but not limited to the average value of the widths, the average value of the frequencies and the average value of the working periods) of the plurality of sampled waveforms of the comparison signal CPOUT, as the load steady state reference value.

Finally, the load transition determining circuit LOD compares the parameter of each of the plurality of waveforms of the comparison signal CPOUT detected by the waveform detector circuit PSD with the load steady state reference value from the average value calculating circuit AVG to determine whether or not the load is in the steady state or in the transient state and to analyze the transition in the load to output the load transition determined signal LOC.

For example, when the parameter of the waveform of the comparison signal CPOUT that is currently detected by the waveform detector circuit PSD of the load transition detecting circuit LODM1 is equal to the load steady state reference value, the load transition determining circuit LOD of the load transition detecting circuit LODM1 determines that the load is in the steady state. Conversely, when the parameter of the waveform of the comparison signal CPOUT that is currently detected by the waveform detector circuit PSD is not equal to the load steady state reference value, the load transition determining circuit LOD determines that the load is in the transient state.

Further, the load transition determining circuit LOD of the load transition detecting circuit LODM1 may determine whether or not the parameter of the waveform of the comparison signal CPOUT that is currently detected by the waveform detector circuit PSD of the load transition detecting circuit LODM1 is higher than the load steady state reference value, and accordingly determine whether or not the load is obtaining power from the output terminal of the power converter.

For example, when the parameter of the waveform of the comparison signal CPOUT that is currently detected by the waveform detector circuit PSD of the load transition detecting circuit LODM1 is higher than the load steady state reference value, the load transition determining circuit LOD of the load transition detecting circuit LODM1 determines that the load is obtaining power from the output terminal of the power converter.

Conversely, when the parameter of the waveform of the comparison signal CPOUT that is currently detected by the waveform detector circuit PSD of the load transition detecting circuit LODM1 is lower than the load steady state reference value, the load transition determining circuit LOD of the load transition detecting circuit LODM1 determines that the load is releasing energy.

The load transition determining circuit LOD of the load transition detecting circuit LODM1 may calculate a difference between the parameter of each of the plurality of waveforms of the comparison signal CPOUT detected by the waveform detector circuit PSD and the load steady state reference value. The load transition determining circuit LOD may, according to the difference, determine whether or not the load is in the steady state or in the transient state and determine the amplitude of the transition occurring in the load.

For example, the load transition determining circuit LOD of the load transition detecting circuit LODM1 may subtract the load steady state reference value from the parameter of each of the plurality of waveforms of the comparison signal CPOU detected by the load transition detecting circuit to obtain a difference. The load transition determining circuit LOD of the load transition detecting circuit LODM1 may determine whether or not the difference is a positive value or a negative value, and accordingly determine whether or not the load is obtaining power from an output terminal of the power or is releasing energy.

Figure 4:
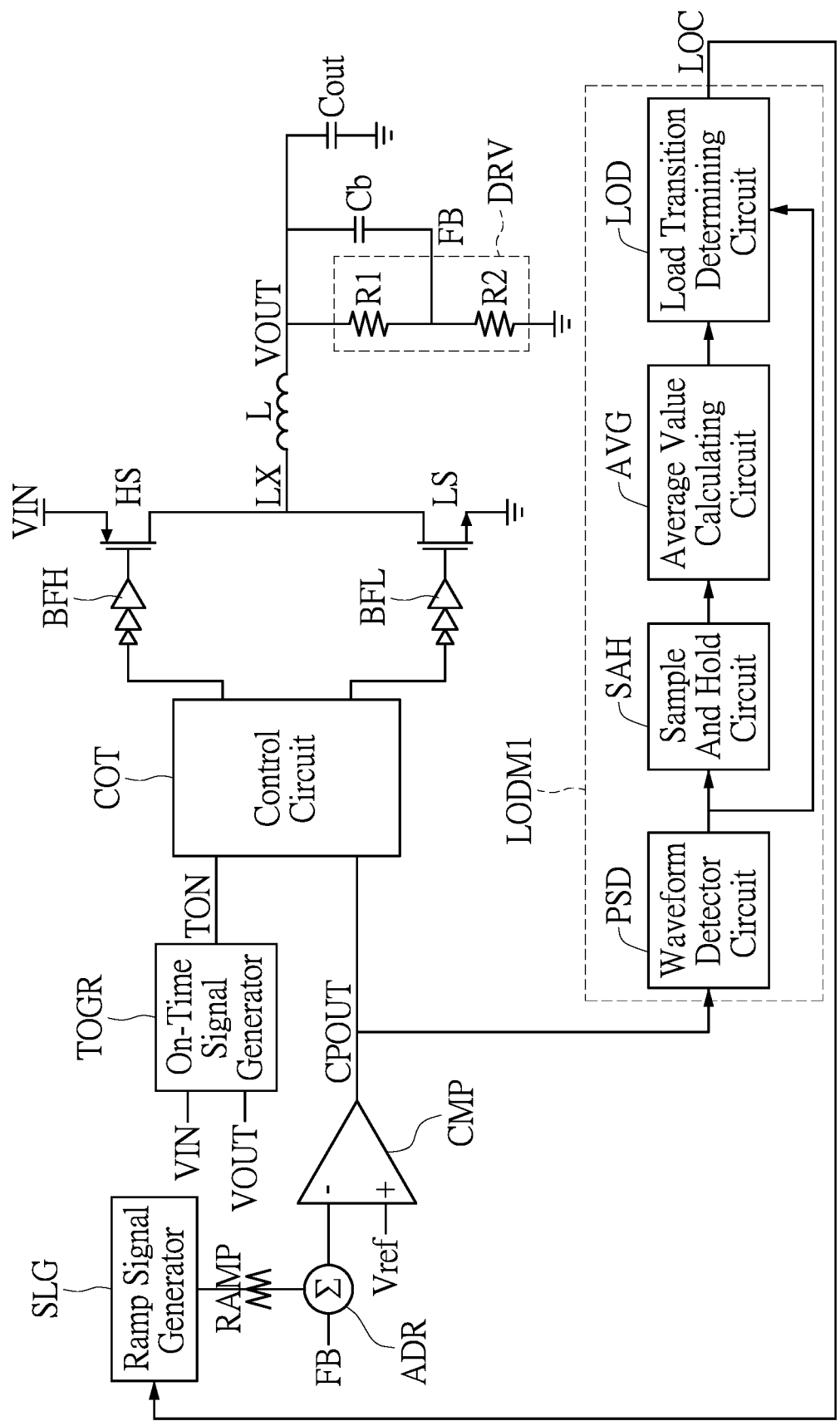
FIG. 4 is a block diagram of a power converter having a load transition detecting mechanism according to a third embodiment of the present disclosure.

Reference is made to FIG. 4, which is a block diagram of a power converter having a load transition detecting mechanism according to a third embodiment of the present disclosure. The descriptions of the third embodiment that are the same as that of the second embodiment are not repeated herein.

A difference between the first to third embodiments is that, the load transition determining circuit LOD of the load transition detecting circuit LODM1 included in the power converter of the third embodiment of the present disclosure is connected to an input terminal of a ramp signal generator SLG, and outputs the load transition determined signal LOC to the ramp signal generator SLG.

The ramp signal generator SLG determines (the plurality of waveforms of) the ramp signal RAMP outputted to the feedback adjusting circuit ADR, according to the load transition determined signal LOC from the load transition determining circuit LOD of the load transition detecting circuit LODM1.

Figure 5:
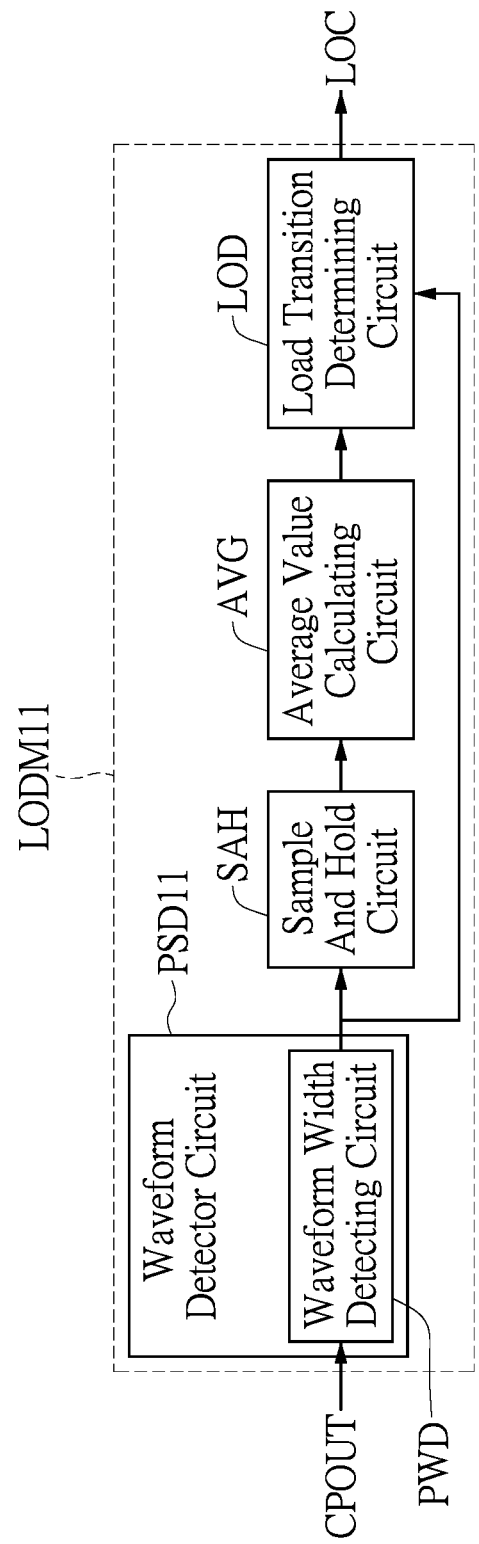
FIG. 5 is a block diagram of a load transition detecting circuit of a power converter having a load transition detecting mechanism according to a fourth embodiment of the present disclosure.

Reference is made to FIG. 5, which is a block diagram of a load transition detecting circuit of a power converter having a load transition detecting mechanism according to a fourth embodiment of the present disclosure.

The load transition detecting circuit LODM as shown in FIG. 1 and the load transition detecting circuit LODM1 as shown in FIGS. 2 and 4 may be replaced with a load transition detecting circuit LODM11 as shown in FIG. 5. The descriptions of the fourth embodiment that are the same as that of the first to third embodiments are not repeated herein.

A difference between the fourth embodiment and the first to third embodiments of the present disclosure is that, a waveform detector circuit PSD11 of the load transition detecting circuit LODM11 of the power converter of the fourth embodiment includes a waveform width detecting circuit PWD.

An input terminal of the waveform width detecting circuit PWD is connected to the output terminal of the comparator CMP. An output terminal of the waveform width detecting circuit PWD is connected to the input terminal of the sample and hold circuit SAH.

The waveform width detecting circuit PWD may detect a plurality of widths (that are included in the plurality of parameters) respectively of the plurality of waveforms (such as the plurality of pulse waves) of the comparison signal CPOUT from the output terminal of the comparator CMP.

The sample and hold circuit SAH may sample and hold some of the plurality of waveforms of the comparison signal CPOUT detected by the waveform width detecting circuit PWD of the waveform detector circuit PSD11, as the plurality of sampled waveforms.

Then, the average value calculating circuit AVG may calculate an average value of the plurality of widths respectively of the plurality of sampled waveforms of the comparison signal CPOUT, as the load steady state reference value.

The load transition determining circuit LOD may compare the width of each of the plurality of waveforms of the comparison signal CPOUT with the load steady state reference value to determine whether or not the load is in the steady state or in the transient state and to determine the transition in the load to output the load transition determined signal LOC (to the ramp signal generator SLG).

Figure 6:
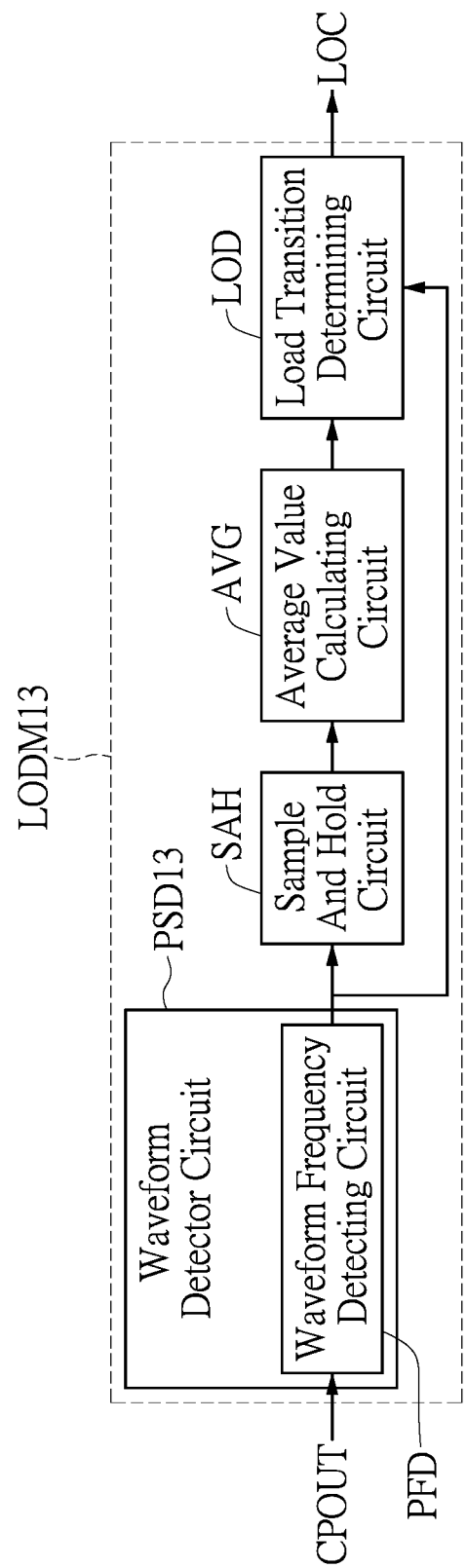
FIG. 6 is a block diagram of a load transition detecting circuit of a power converter having a load transition detecting mechanism according to a fifth embodiment of the present disclosure.

Reference is made to FIG. 6, which is a block diagram of a load transition detecting circuit of a power converter having a load transition detecting mechanism according to a fifth embodiment of the present disclosure.

The load transition detecting circuit LODM as shown in FIG. 1 and the load transition detecting circuit LODM1 as shown in FIGS. 2 and 4 may be replaced with a load transition detecting circuit LODM13 as shown in FIG. 6. The descriptions of the fifth embodiment that are the same as that of the first to third embodiments are not repeated herein.

A difference between the fifth embodiment and the first to third embodiments of the present disclosure is that, a waveform detector circuit PSD13 of the load transition detecting circuit LODM13 included in the power converter of the fifth embodiment of the present disclosure includes a waveform frequency detecting circuit PFD.

An input terminal of the waveform frequency detecting circuit PFD is connected to the output terminal of the comparator CMP. An output terminal of the waveform frequency detecting circuit PFD is connected to the input terminal of the sample and hold circuit SAH.

The waveform frequency detecting circuit PFD may detect a plurality of frequencies (that are included in the plurality of parameters as described above) of the plurality of waveforms (such as the plurality of pulse waves) of the comparison signal CPOUT from the output terminal of the comparator CMP.

The sample and hold circuit SAH may sample and hold some of the plurality of waveforms of the comparison signal CPOUT detected by the waveform frequency detecting circuit PFD of the waveform detector circuit PSD13, as the plurality of sampled waveforms.

Then, the average value calculating circuit AVG may calculate an average value of the plurality of frequencies respectively of the plurality of sampled waveforms of the comparison signal CPOUT, as the load steady state reference value.

The load transition determining circuit LOD may compare the frequency of each of the plurality of waveforms of the comparison signal CPOUT with the load steady state reference value to determine whether or not the load is in the steady state or in the transient state and to determine the transition in the load to output the load transition determined signal LOC (to the ramp signal generator SLG).

Figure 7:
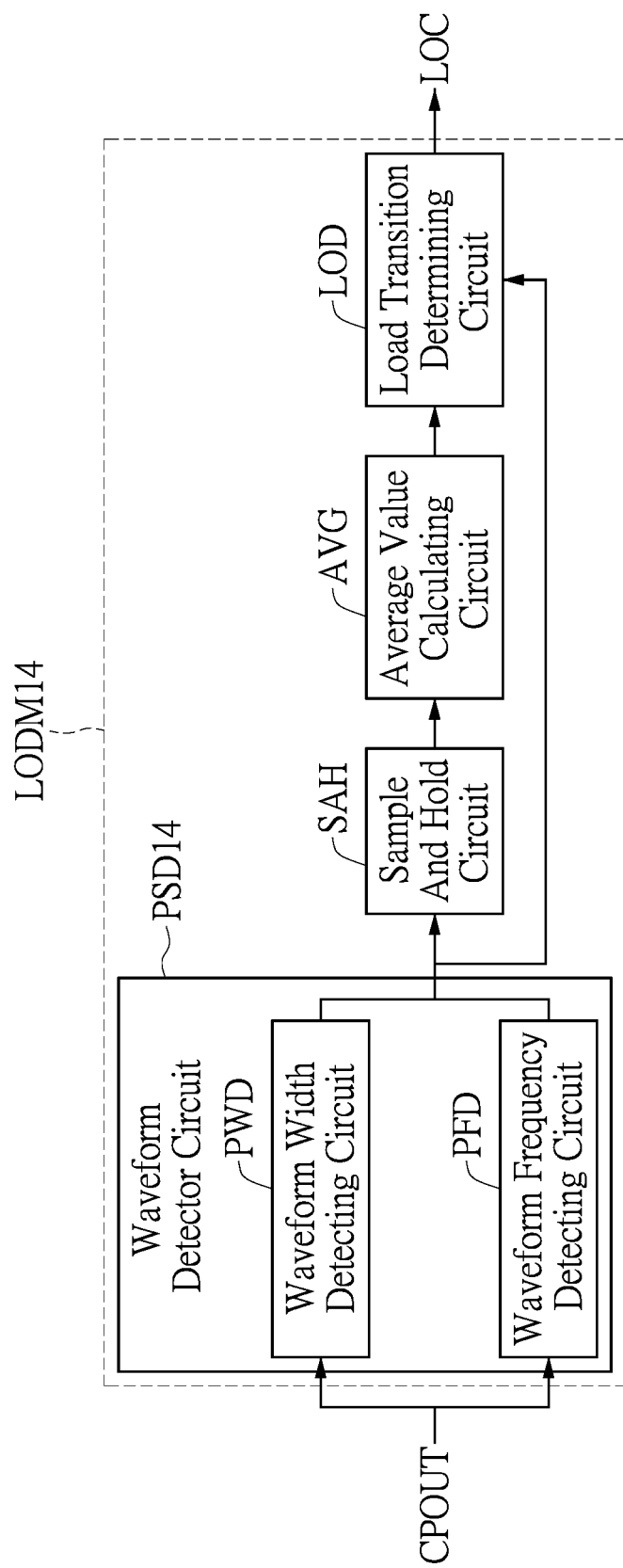
FIG. 7 is a block diagram of a load transition detecting circuit of a power converter having a load transition detecting mechanism according to a sixth embodiment of the present disclosure.

Reference is made to FIG. 7, which is a block diagram of a load transition detecting circuit of a power converter having a load transition detecting mechanism according to a sixth embodiment of the present disclosure.

The load transition detecting circuit LODM as shown in FIG. 1 and the load transition detecting circuit LODM1 as shown in FIGS. 2 and 4 may be replaced with a load transition detecting circuit LODM14 as shown in FIG. 7. The descriptions of the sixth embodiment that are the same as that of the first to fifth embodiments are not repeated herein.

As shown in FIG. 7, in the sixth embodiment of the present disclosure, a waveform detector circuit PSD14 of the load transition detecting circuit LODM11 includes the waveform width detecting circuit PWD for detecting the widths of the plurality of waveforms of the comparison signal CPOUT, and the waveform frequency detecting circuit PFD for detecting the frequencies of the plurality of waveforms of the comparison signal CPOUT.

That is, the load transition detecting circuit of the power converter of the present disclosure may detect the plurality of parameters including the widths and the frequencies of the plurality of waveforms of the comparison signal CPOUT, and accordingly determines the change in the state of the load as described above.

Reference is made to FIGS. 8 to 11, which are waveform diagrams of signals of the power converter having the load transition detecting mechanism according to the first to sixth embodiment of the present disclosure.

Figure 8:
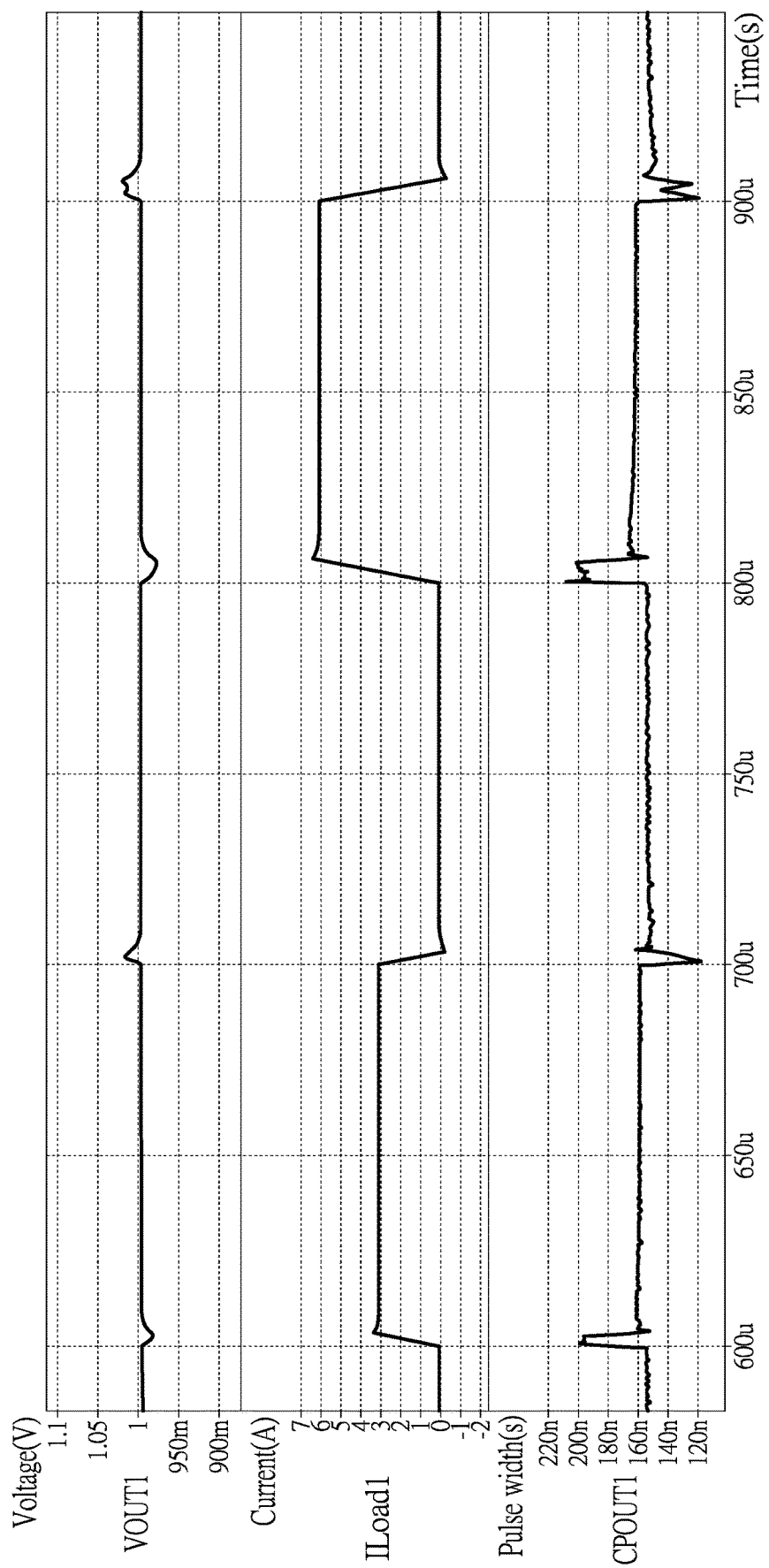
FIG. 8 is a waveform diagram of signals of the power converter having the load transition detecting mechanism according to the first to sixth embodiment of the present disclosure.

The output voltage VOUT of the power converter of the present disclosure (such as the power converter as shown in FIGS. 1, 2 and 4) may be the same as an output voltage VOUT1 as shown in FIG. 8. A current flowing through the load may be the same as a load current ILoad1 as shown in FIG. 8, a load current ILoad2 as shown in FIG. 9, a load current ILoad3 as shown in FIG. 10, or a load current ILoad4 as shown in FIG. 11.

Figure 9:
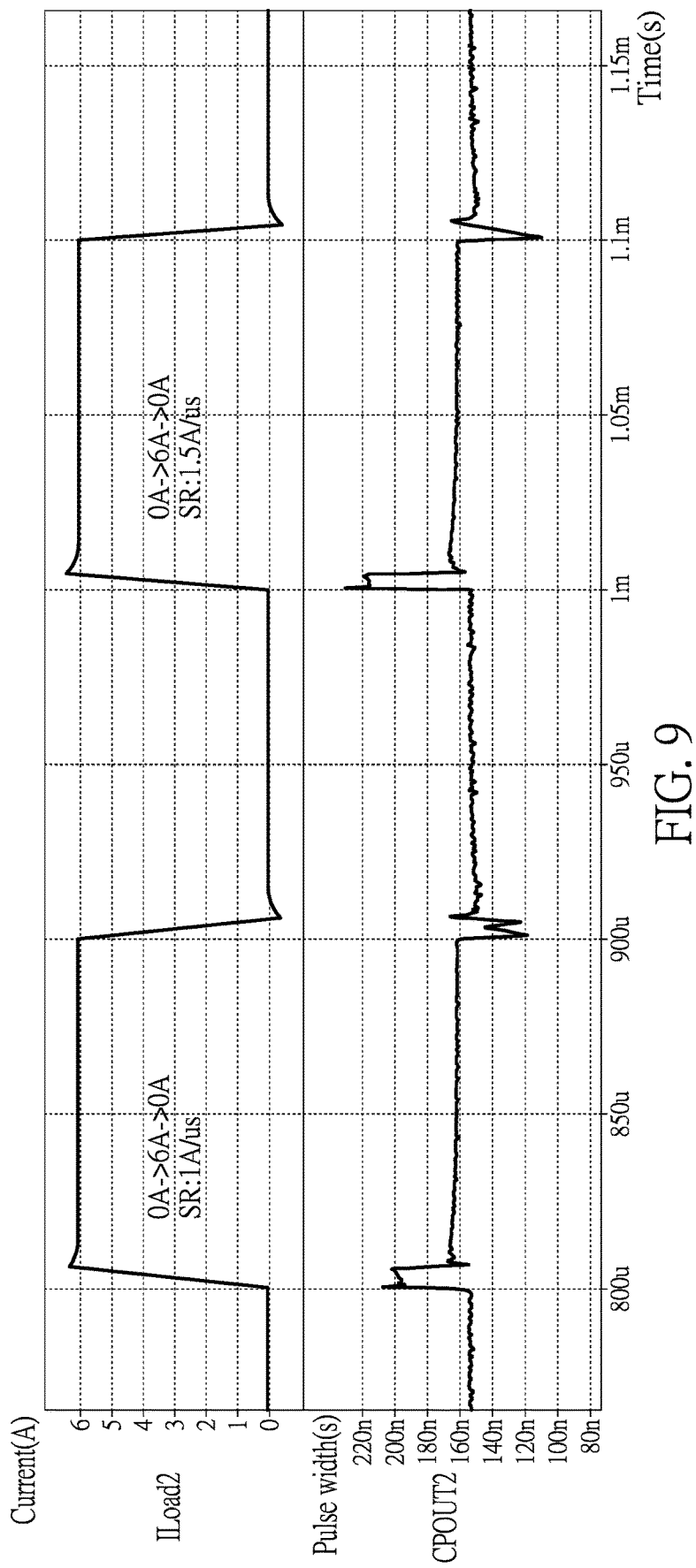
FIG. 9 is a waveform diagram of signals of the power converter having the load transition detecting mechanism according to the first to sixth embodiment of the present disclosure.
Figure 10:
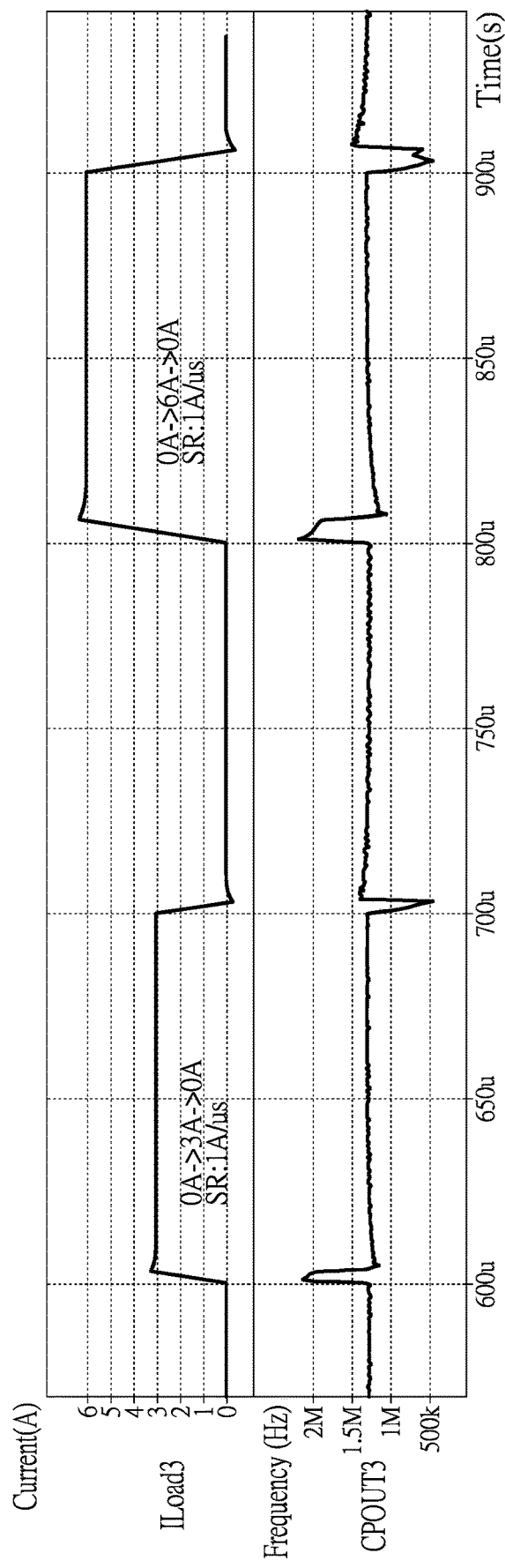
FIG. 10 is a waveform diagram of signals of the power converter having the load transition detecting mechanism according to the first to sixth embodiment of the present disclosure.
Figure 11:
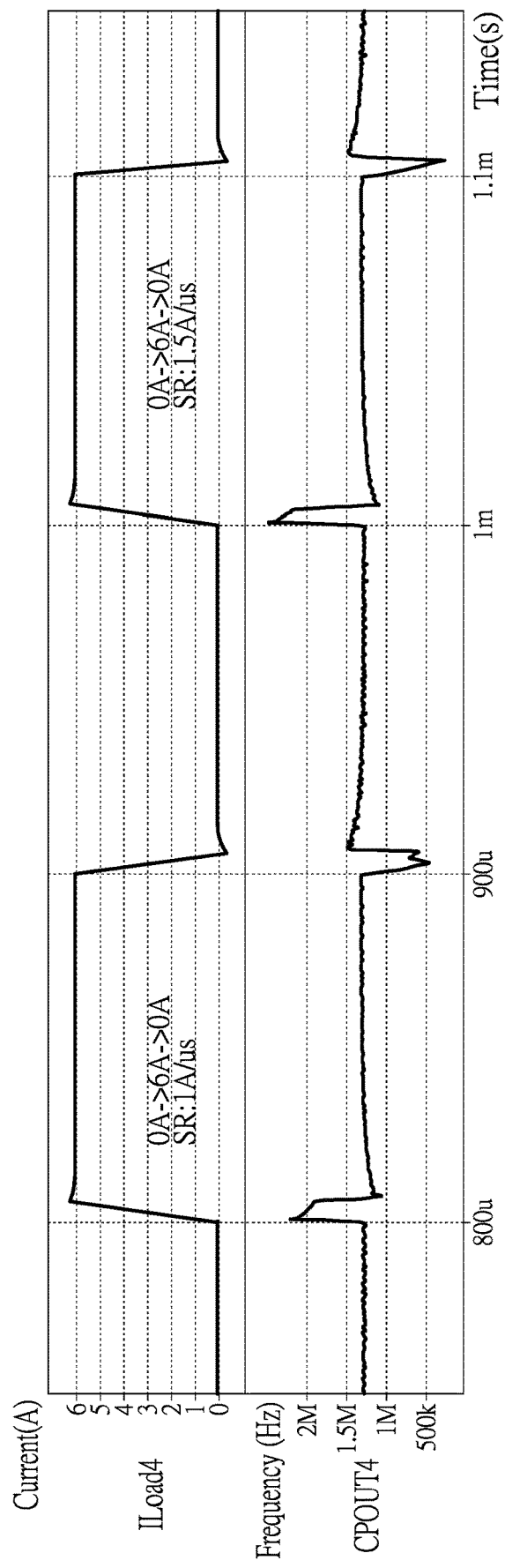
FIG. 11 is a waveform diagram of signals of the power converter having the load transition detecting mechanism according to the first to sixth embodiment of the present disclosure.

The comparison signal CPOUT detected by the load transition detecting circuit such as the load transition detecting circuit LODM, LODM1, LODM11, LODM13, LODM14 of the power converter of the present disclosure as shown in FIGS. 1 to 8 may be the same as a comparison signal CPOUT1 as shown in FIG. 8, a comparison signal CPOUT2 as shown in FIG. 9, a comparison signal CPOUT3 as shown in FIG. 10 or a comparison signal CPOUT4 as shown in FIG. 11.

As shown in FIGS. 8 to 11, the comparison signal CPOUT1, CPOUT2, CPOUT3 or CPOUT4 that is outputted by the comparator CMP and then detected by the load transition detecting circuit may include a plurality of positive half-waves and a plurality of negative half-waves.

The (sample and hold circuit such as the sample and hold circuit SAH of) the load transition detecting circuit may sample and hold at least one of the plurality of positive half-waves of the comparison signal CPOUT1, CPOUT2, CPOUT3 or CPOUT4, as at least one sampled positive half-waves. The (sample and hold circuit such as the sample and hold circuit SAH of) the load transition detecting circuit may sample and hold at least one of the plurality of negative half-waves of the comparison signal CPOUT1, CPOUT2, CPOUT3 or CPOUT4, as at least one sampled negative half-waves.

The load transition detecting circuit may calculate an average value of the parameters of the at least one sampled positive half-waves and the at least one sampled negative half-waves, as the load steady state reference value. For example, the load transition detecting circuit may calculate the average value of the widths of the at least one sampled positive half-waves and the at least one sampled negative half-waves. In addition or alternatively, the load transition detecting circuit may calculate the average value of the frequencies of the at least one sampled positive half-waves and the at least one sampled negative half-waves.

For example, when the parameter (such as a peak value) of a first one of the plurality of waveforms of the comparison signal CPOUT1, CPOUT2, CPOUT3 or CPOUT4 that is currently detected by the load transition detecting circuit is higher than the load steady state reference value (that is a value represented by a horizontal waveform segment of the comparison signal CPOUT1, CPOUT2, CPOUT3 or CPOUT4 in FIGS. 8 to 11), the load transition detecting circuit determines that the first one of the plurality of waveforms of the comparison signal CPOUT1, CPOUT2, CPOUT3 or CPOUT4 is the positive half-wave. Accordingly, the load transition detecting circuit determines that the load is obtaining power from the output terminal of the power converter.

Conversely, when the parameter (such as a valley value) of a second one of the plurality of waveforms of the comparison signal CPOUT1, CPOUT2, CPOUT3 or CPOUT4 that is currently detected by the load transition detecting circuit is lower than the load steady state reference value (that is the value represented by the horizontal waveform segment of the comparison signal CPOUT1, CPOUT2, CPOUT3 or CPOUT4 in FIGS. 8 to 11), the load transition detecting circuit determines that the second one of the plurality of waveforms of the comparison signal CPOUT1, CPOUT2, CPOUT3 or CPOUT4 is the negative half-wave. Accordingly, the load transition detecting circuit determines that the load is releasing energy.

When the parameter of one of the plurality of waveforms of the comparison signal CPOUT1, CPOUT2, CPOUT3 or CPOUT4 that is currently detected by the load transition detecting circuit is equal to the load steady state reference value (that is the value represented by the horizontal waveform segment of the comparison signal CPOUT1, CPOUT2, CPOUT3 or CPOUT4 in FIGS. 8 to 11), the load transition detecting circuit determines that the load is in the steady state.

The larger the width of the waveform (such as the pulse wave) of the comparison signal CPOUT1, CPOUT2, CPOUT3 or CPOUT4 that is outputted by the comparator CMP and currently detected by the load transition detecting circuit is, the longer the length of the time during which the transition occurs in the load is determined by the load transition detecting circuit.

The larger the frequency of the waveform of the comparison signal CPOUT1, CPOUT2, CPOUT3 or CPOUT4 that is currently detected by the load transition detecting circuit is, the larger the slew rate of the load and the faster the transition occurring in the load are determined by the load transition detecting circuit.

In conclusion, the present disclosure provides the power converter having the load transition detecting mechanism. The load transition detecting circuit of the power converter of the present disclosure detects data at the output terminal of the power converter connected to the load to determine that the load is in the steady state or in the transient state. When the load is in the transient state, the load transition detecting circuit of the power converter of the present disclosure is able to further determine whether or not the load is obtaining power from the output terminal of the power converter or is releasing energy.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a load transition detecting mechanism, comprising:
    a high-side switch, wherein a first terminal of the high-side switch is coupled to an input voltage;
    a low-side switch, wherein a first terminal of the low-side switch is connected to a second terminal of the high-side switch, a second terminal of the low-side switch is grounded, a node between the first terminal of the low-side switch and the second terminal of the high-side switch is connected to a first terminal of an inductor, a second terminal of the inductor is connected to a first terminal of an output capacitor, a second terminal of the output capacitor is grounded, and a node between the second terminal of the inductor and the first terminal of the output capacitor is used as a feedback node of the power converter and connected to a load;
    a control circuit, wherein an output terminal of the control circuit is connected to a control terminal of the high-side switch and a control terminal of the low-side switch;
    a comparator, wherein a first input terminal of the comparator is connected to the feedback node of the power converter, a second input terminal of the comparator is coupled to a reference voltage, and an output terminal of the comparator is connected to an input terminal of the control circuit; and
    a load transition detecting circuit connected to an output terminal of the comparator, wherein the load transition detecting circuit detects a plurality of parameters of a plurality of waveforms of a comparison signal from the output terminal of the comparator, the load transition detecting circuit samples and holds some of the plurality of waveforms of the comparison signal as a plurality of sampled waveforms, the load transition detecting circuit calculates an average value of the plurality of parameters respectively of the plurality of sampled waveforms as a load steady state reference value, and the load transition detecting circuit compares the parameter of each of the plurality of waveforms of the comparison signal with the load steady state reference value to determine whether or not the load is in a steady state or in a transient state and to determine an amplitude of a transition occurring in the load.

2. The power converter according to claim 1, wherein the load transition detecting circuit calculates a difference between the parameter of each of the plurality of waveforms of the comparison signal and the load steady state reference value, and the load transition detecting circuit determines whether or not the load is in the steady state or in the transient state and determines the amplitude of the transition occurring in the load according to the difference.

3. The power converter according to claim 1, wherein the comparison signal outputted by the comparator includes a plurality of positive half-waves and a plurality of negative half-waves, the load transition detecting circuit samples and holds at least one of the plurality of positive half-waves as at least one sampled positive half-waves, the load transition detecting circuit samples and holds at least one of the plurality of negative half-waves as at least one sampled negative half-waves, and the load transition detecting circuit calculates an average value of the parameters of the at least one sampled positive half-waves and the at least one sampled negative half-waves as the load steady state reference value.

4. The power converter according to claim 1, wherein, when the parameter of one of the plurality of waveforms of the comparison signal that is currently detected by the load transition detecting circuit is equal to the load steady state reference value, the load transition detecting circuit determines that the load is in the steady state.

5. The power converter according to claim 1, wherein, when the parameter of one of the plurality of waveforms of the comparison signal that is currently detected by the load transition detecting circuit is not equal to the load steady state reference value, the load transition detecting circuit determines that the load is in the transient state.

6. The power converter according to claim 1, wherein the load transition detecting circuit determines whether or not the parameter of one of the plurality of waveforms of the comparison signal that is currently detected is higher than the load steady state reference value to determine whether or not the load is obtaining power from an output terminal of the power converter.

7. The power converter according to claim 1, wherein, when the parameter of one of the plurality of waveforms of the comparison signal that is currently detected by the load transition detecting circuit is higher than the load steady state reference value, the load transition detecting circuit determines that the load is obtaining power from an output terminal of the power converter.

8. The power converter according to claim 1, wherein, when the parameter of one of the plurality of waveforms of the comparison signal that is currently detected by the load transition detecting circuit is lower than the load steady state reference value, the load transition detecting circuit determines that the load is releasing energy.

9. The power converter according to claim 1, wherein the load transition detecting circuit subtracts the load steady state reference value from the parameter of one of the plurality of waveforms of the comparison signal that is currently detected by the load transition detecting circuit to obtain a difference, and the load transition detecting circuit determines whether or not the load is obtaining power from an output terminal of the power converter or is releasing energy according to the difference.

10. The power converter according to claim 1, wherein the load transition detecting circuit includes:
a waveform detector circuit connected to the output terminal of the comparator, and configured to detect the parameters of the plurality of waveforms of the comparison signal from the output terminal of the comparator;
a sample and hold circuit connected to the waveform detector circuit, and configured to sample and hold some of the plurality of waveforms of the comparison signal detected by the waveform detector circuit as the plurality of sampled waveforms;
an average value calculating circuit connected to the sample and hold circuit, and configured to calculate an average value of the plurality of parameters respectively of the plurality of sampled waveforms as the load steady state reference value; and
a load transition determining circuit connected to the average value calculating circuit, wherein the load transition determining circuit compares the parameter of each of the plurality of waveforms of the comparison signal with the load steady state reference value to determine whether or not the load is in the steady state or in the transient state and to determine the amplitude of the transition occurring in the load.

11. The power converter according to claim 10, wherein the waveform detector circuit includes:
a waveform width detecting circuit connected to the output terminal of the comparator and an input terminal of the sample and hold circuit, and configured to detect a plurality of widths of the plurality of waveforms respectively of the comparison signal from the output terminal of the comparator;
wherein the average value calculating circuit calculates an average value of the plurality of widths respectively of the plurality of sampled waveforms, as the load steady state reference value;
wherein the load transition determining circuit compares the width of each of the plurality of waveforms of the comparison signal with the load steady state reference value to determine whether or not the load is in the steady state or in the transient state and to determine the amplitude of the transition occurring in the load.

12. The power converter according to claim 10, wherein the waveform detector circuit includes:
a waveform frequency detecting circuit connected to the output terminal of the comparator and the input terminal of the sample and hold circuit, and configured to detect a plurality of frequencies of the plurality of waveforms respectively of the comparison signal from the output terminal of the comparator;
wherein the average value calculating circuit calculates an average value of the plurality of frequencies respectively of the plurality of sampled waveforms, as the load steady state reference value;
wherein the load transition determining circuit compares the frequency of each of the plurality of waveforms of the comparison signal with the load steady state reference value to determine whether or not the load is in the steady state or in the transient state and to determine the amplitude of the transition occurring in the load.

13. The power converter according to claim 1, further comprising:
a voltage driver circuit connected to a node between the second terminal of the inductor and the first terminal of the output capacitor, connected to the first input terminal of the comparator, and configured to divide a voltage of the feedback node to output a feedback voltage to the first input terminal of the comparator.

14. The power converter according to claim 13, wherein the voltage driver circuit includes:
a first resistor, wherein a first terminal of the first resistor is connected to the node between the second terminal of the inductor and the first terminal of the output capacitor; and
a second resistor, wherein a first terminal of the second resistor is connected to a second terminal of the first resistor, a second terminal of the second resistor is grounded, and a node between the first terminal of the second resistor and the second terminal of the first resistor is used as the feedback node of the power converter and is connected to the first input terminal of the comparator.

15. The power converter according to claim 1, further comprising:
a feedback adjusting circuit connected to the feedback node of the power converter, the first input terminal of the comparator and a ramp signal generator, wherein the feedback adjusting circuit adjusts a feedback signal from the feedback node to output a feedback adjusted signal to the first input terminal of the comparator according to a ramp signal from the ramp signal generator.

\* \* \* \* \*